March 27, 1956 P. J. McCULLOUGH 2,739,523
ELECTRIC TOASTER
Filed Jan. 12, 1951 3 Sheets-Sheet 2
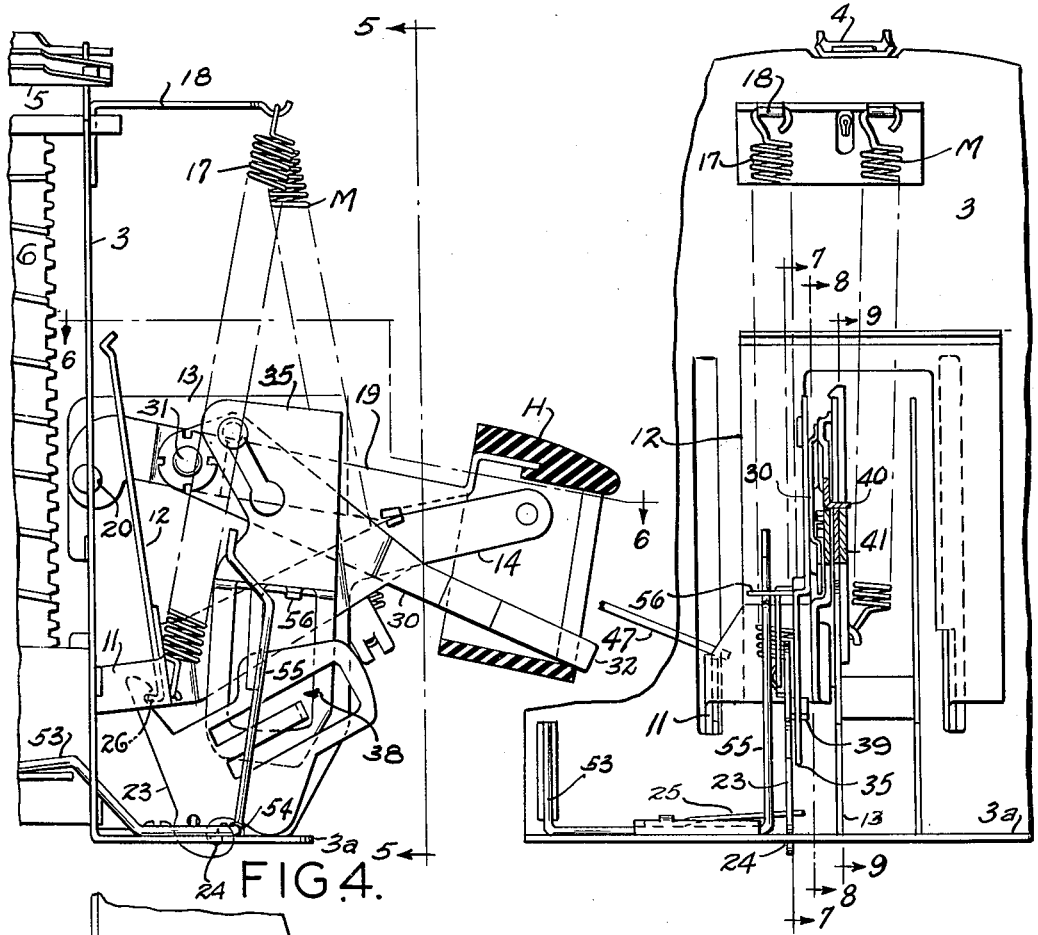
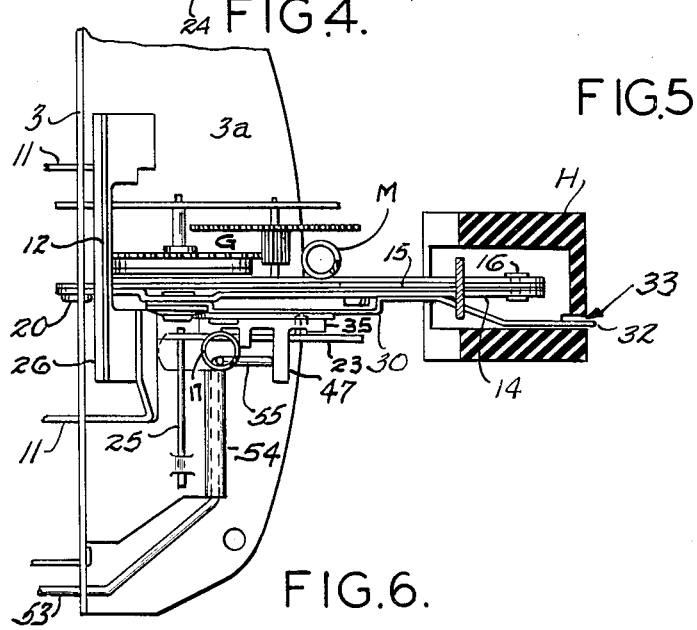
Inventor
Paul J. McCullough
By Rodney Bedell
Atty.

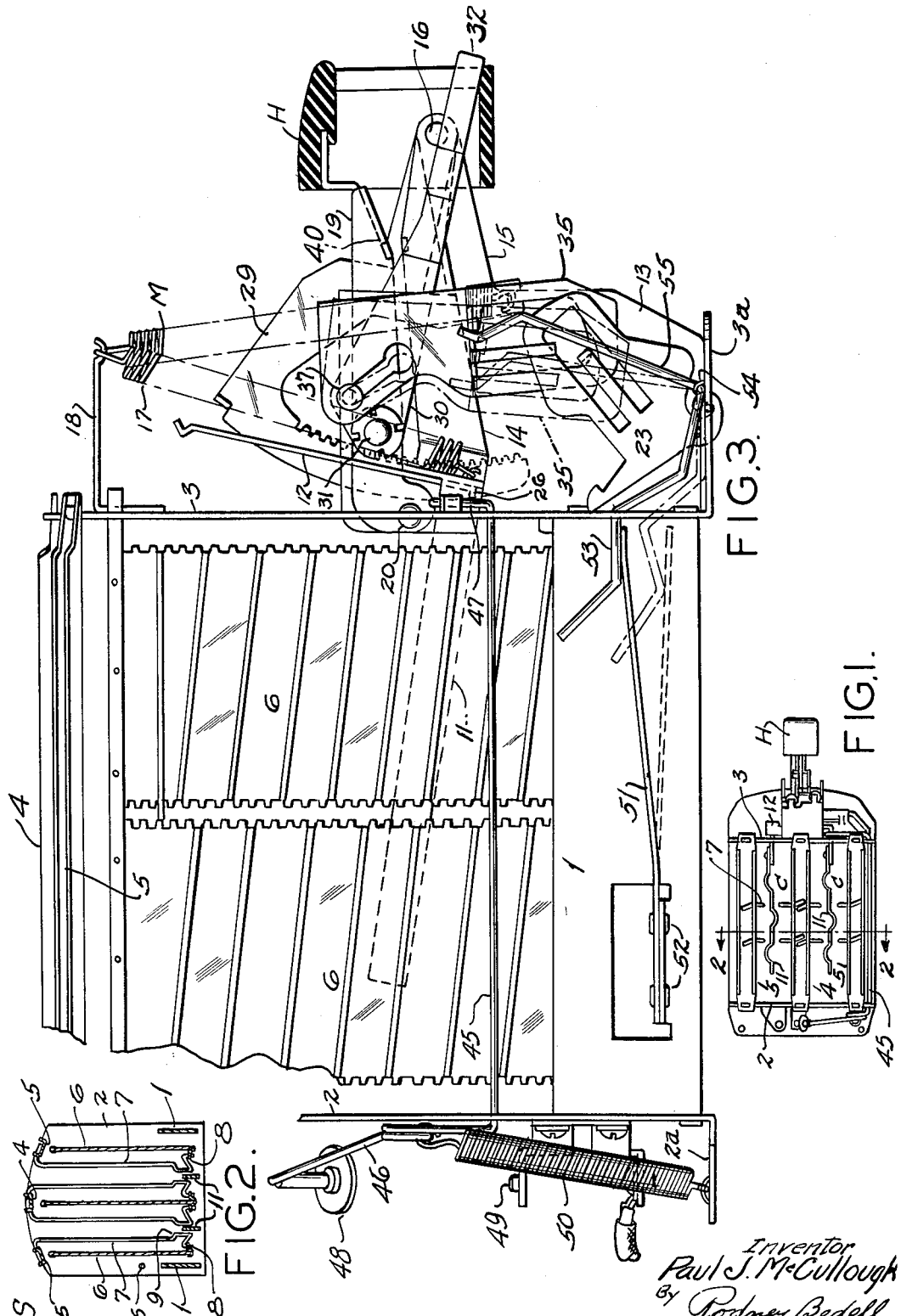

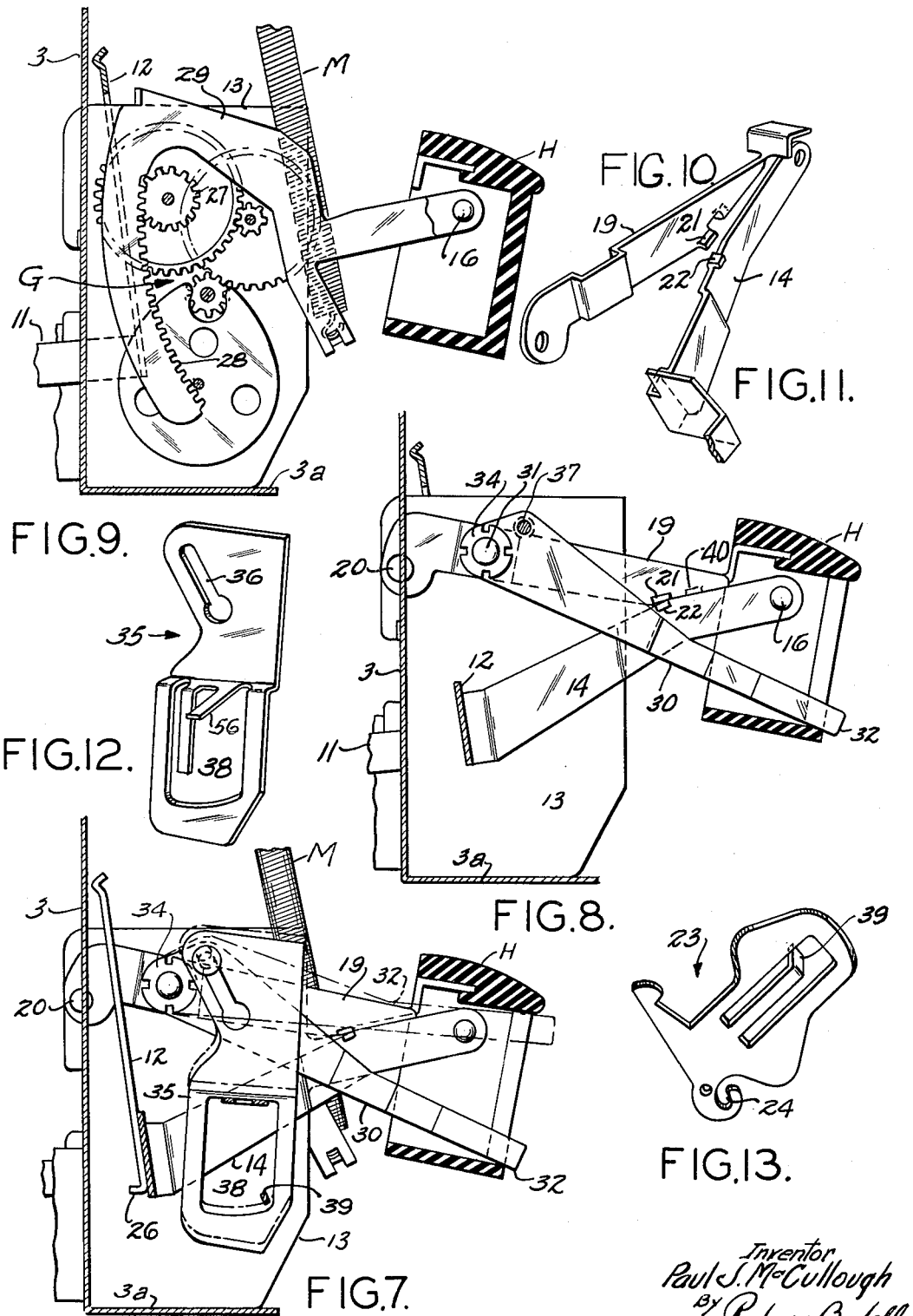

United States Patent Office 2,739,523
Patented Mar. 27, 1956

2,739,523

ELECTRIC TOASTER

Paul J. McCullough, St. Louis, Mo., assignor to The Toastswell Company, Inc., St. Louis, Mo., a corporation of Missouri Application January 12, 1951, Serial No. 205,651

10 Claims. (Cl. 99—328)

The invention relates to bread toasters of the domestic type in which one or more slices of bread are placed within a housing and the slices are lowered into toasting position between spaced upright electric resistance heaters by depressing a handle at the outside of the housing, which action also closes an electric circuit and winds a clockwork mechanism which operates to open the circuit at a predetermined time.

One object of the invention is to provide simple effective mechanism for lowering the slice carrier, for terminating the toaster operation, for raising the slice carrier automatically when the toasting operation is terminated and for manually raising the slice carrier at any time during the toasting operation without affecting the timing mechanism.

Another object is to cushion the slice carrier in its movements to and from a toasting position.

Another object is to raise and lower the slice by a simple carrier, movable about a pivot to extreme positions in which it is inclined to the horizontal, but to support the slice with its lower edge disposed horizontally and independently of the carrier while the slice is being toasted and to relieve the timing mechanism of the weight of the slice.

Another object is to control the timing mechanism by including a device for setting the toaster to produce relatively light or relatively dark toast by shifting a control element on the handle used to elevate and lower the slice carrier.

These and other detailed objects are attained by the structure illustrated in the accompanying drawings, in which:

Figure 1 is a top view of a toaster with the outer housing removed and showing the general arrangement of a frame, toasting compartments, slice supports, guard wires, switch crank arm and operating handle.

Figure 2 is a vertical section on the line 2—2 of Figure 1.

Figure 3 is a side elevation of the structure shown in Figures 1 and 2 with the hollow operating handle sectioned to better illustrate the parts received within it. The figure is drawn to a much enlarged scale and shows the operating handle and associated parts in a position approximately at the beginning of a toasting operation.

Figure 4 is a detailed section similar to the right hand portion of Figure 3 but showing the parts approximately at the beginning of a toasting operation.

Figure 5 is an end view of the structure shown in Figure 4.

Figure 6 is a detail top view of the structure shown in Figures 4 and 5, a portion of the handle being sectioned horizontally to better illustrate the invention.

Figure 7 is a detail view and section taken approximately on the line 7—7 of Figure 5 and corresponding generally to Figure 4 but with some of the parts omitted and showing the structure for manually effecting adjustment of the toasting period for producing light and dark toast.

Figure 8 is a detail view and section taken approximately on the line 8—8 of Figure 5 with additional parts removed to better illustrate the assembly of the parts shown.

Figure 9 is a detail view and section taken approximately on the line 9—9 of Figure 5, showing the connection of the timing mechanism to the parts associated therewith.

Figure 10 is a perspective of the handle mounting lever and Figure 11 is a similar view of the corresponding end portion of the slice carrier, the lever and carrier being shown in approximately the relative positions occupied when assembled.

Figure 12 is a detail of the main link between the operating handle and the latch which holds the carrier in slice toasting position.

Figure 13 is a detail of the latch associated with the link shown in Figure 12.

Generally speaking, the toaster frame includes side bars 1, end plates 2 and 3 flanged at their lower ends at 2a and 3a, respectively, and longitudinal top bars 4 and 5. Heating elements 6 are carried by the end plates 2 and 3 and with the end plates define toasting compartments C. Guard wires 7 have their upper and lower ends secured to top bars 4 and to strips 8 extending along the lower edges of heating elements 6. Guard wires 7 have upwardly facing shoulders 9 (Figure 2) near the lower ends of the toasting compartments. The upper portions of the opposite guard wires are spaced apart to receive between them a bread slice S. The corresponding shoulders are spaced apart a relatively smaller distance so that the shoulders will support a bread slice.

A slice carrier includes two bars 11 extending longitudinally of toasting compartments C between associated guard wires 7 and through a slot in end plate 3 with their ends bent towards each other and secured to an inverted U-shaped yoke 12 extending transversely of the frame provided with an extension 14 extending lengthwise of and away from the frame. An upstanding bracket 13, mounted on end plate flange 3a extends longitudinally of the toaster and includes an extension 15. Extension 14 is pivoted at 16 to extension 15. Elements 11, 12, and 14 form a substantially rigid unit which may be considered generally as the slice carrier. A coil spring 17 is tensioned between a hook 18 on end plate 3 and the carrier at the lower end of yoke 12 and tends to thrust the carrier upwardly to the position shown in Figure 3.

An operating lever 19 is pivoted at 20 on bracket 13 adjacent end plate 3 and extends outwardly therefrom and carries at its outer end a manually engageable handle H of plastic or similar material hollowed to freely receive the outer portion of carrier extension 14, bracket extension 15 and other parts referred to below. Intermediate the ends of lever 19 is a lateral projection 21 opposing a corresponding projection 22 on carrier extension 14 (Figures 10, 11). When handle 21 is moved downwardly, projection 21 engages projection 22 and moves the carrier downwardly to the position indicated in Figures 4, 7, and 8. A latch 23 (Figures 3, 4, 13) is pivoted at 24 to flange 3a and a spring 25 (Figures 5, 6) thrusts the latch in a clockwise direction. The latch engages a lip 26 on the carrier yoke (Figure 4) to hold the carrier in lowered position against the tension of spring 17.

A timing mechanism is mounted on the frame end bracket 13 at the side of the latter opposite to parts 14, 20 and 23 and consists of known clockwork having a main spring M, and escape wheel and reduction gearing indicated at G (Figure 9), the last cog 27 of which meshes with a rack 28 on a segment 29 with an arm 41 pivoted at 16 to the outer end of extension 15.

To adjust the timing mechanism to produce light or dark toast as desired, a control finger 30 is pivoted at 31 to lever 19 and extends alongside of and beyond the outer end of the latter and through the hollow handle H with its tip 32 projecting through a vertical slot 33 in the outer wall of the handle (Figure 6) to be readily visible to the user and adjustable vertically of the handle between the positions shown in Figure 7. A spring washer 34 frictionally retains finger 30 in adjusted position.

Finger 30 and latch 23 are connected by a link member 35 (Figure 12) having a slot 36 at its upper end slidably receiving a headed pin 37 (Figure 7) on finger 30 and freely pivoting the link. A rectangular opening 38 in the lower portion of the link receives a lip 39 on latch 23 (Figure 5).

When handle H is moved downwardly to begin a toasting operation and lower the carrier and a slice thereon in the toasting compartment, a tongue 40 on the far side of lever 19 engages the radial arm 41 of segment 29 (Figure 5) and moves the latter downwardly, rotating the clock mechanism to stretch spring M until latch 23 engages lip 26 on yoke 12. As the clockwork operates to raise rack 28, arm 41 lifts tongue 40 and lever 19 until pin 37 lifts link 35 and the lower end of the latter engages lip 39 and tilts latch 23 about its pivot 24 to release lip 26 on yoke 12, whereupon spring 17 lifts the carrier to a raised position, during which movement the carrier picks up the slice or slices on the guard wire shoulders and raises them to projecting position, where their upward edges extend above the top of the toaster housing.

To avoid the upward movement of the carrier being sudden and "popping" the slice out of the top of the housing, the carrier is associated with a switch opening and closing structure which includes a shaft 45 (Figures 1, 2, 3) extending lengthwise of the toaster outside of the heating chamber and pivoted in end plates 2 and 3 and provided with cranks 46 and 47 at its opposite ends. Crank 46 forms a switch arm and carries a disc 48 adapted, when lowered, to connect spaced contacts 49 to close the toaster circuit. A switch closer spring 50 is tensed between arm 46 and end plate flange 2a.

This switch structure is described in detail and claimed in a co-pending application, Serial No. 188,500, filed October 5, 1950, now Patent No. 2,675,447, issued April 13, 1954. Crank arm 47 on the other end of shaft 45 overlies the nearer carrier bar 11 and is raised by the carrier and its spring 17 when latch 23 is released. Hence, the latter part of the upward movement of the carrier rotates shaft 45 and lifts switch control crank arm 46 quickly, avoiding arcing between elements 48 and 49. Spring 50 is not sufficiently tensed to prevent the final upward movement of arm 46, when shaft 45 is rotated by spring 17, to the extreme position indicated in Figure 3, but it will act near the end of the upward movement of the carrier to snub its movement so that the slice is raised easily above the top of the casing rather than being "popped" out.

The time required for link 35 to engage latch lip 39 may be controlled manually by shifting finger 30 in handle H, as best shown in Figure 7. When the user desires to produce dark toast; that is, when a slice is to be exposed to the heating elements for a maximum period, the tip 32 of finger 30 is moved to its lowermost position, shown in solid lines in Figure 7, and link 35 is lowered accordingly and hence a longer time expires before the upwardly moving link contacts latch lip 39. When finger 30 and its lip 32 are moved to the position shown in dot-dash lines in Figure 7, link 35 is similarly raised to the dot-dash line position and, as the clockwork raises link 35, it engages latch lip 39 sooner than it would otherwise, thus more promptly terminating the toasting operation and producing light toast. "Lighter" and "Darker" will be lettered or the adjustment otherwise indicated on the outer face of handle H for guidance of the user.

The time required for a toasting operation may be varied automatically by a thermostat control so as to produce more uniform toasting of successive slices. When a toaster is first used in a series of toasting operations, all of its parts are relatively cold and the first slice toasted should be exposed to the heating elements for a longer period than subsequent slices to reach a predetermined degree of brownness. While the desired uniformity of toasting of successive slices may be approximated by manual control by manipulation of finger 30 as described above, the desired result is effected automatically by a thermostat control. A bimetal strip 51 has one end anchored to the machine frame at 52 and has its other end underlying one arm 53 of a bell crank pivoted on the frame at 54 with its other arm 55 extending upwardly alongside a lateral projection 56 on link 35 (Figure 5).

When the toaster is relatively cool strip 51 assumes the dot-dash line position shown in Figure 3 and bell crank 53, 55 will be tilted to the dot-dash line position by the weight of its horizontal arm 53. Its upright arm 55 will be spaced from projection 56 on link 35, which may swing freely about its pivot support 37 to the position shown in full lines in Figure 4, in which the lower end of its slot 38 is spaced below latch lip 39 and it is necessary for the clock mechanism to raise link 35 before the latter contacts latch tongue 39. As the toaster frame heats up, thermostat 51 distorts upwardly and tilts bell crank 53, 55 so that the upper end of its upright arm engages latch projection 56 and swing the latch to the full line position shown in Figure 3. The inclination of the lower edge of slot 38 is such that, as the link swings to the right, the slot edge approaches latch projection 39 and the length of time for the upwardly moving link to engage the latch and release the carrier is shortened. If the toaster remains idle for a substantial period and its frame cools off, thermostat 51 moves downwardly and in this manner uniform toasting of successive slices is maintained.

It will be seen that applicant has provided a simple pivoted lever for raising and lowering the slices. In its extreme raised and lowered positions, this lever is inclined to the horizontal but during the toasting operation the slices are supported wholly on the guard arm shoulders and the carrier and the clockwork mechanism is relieved of the weight of the slices and its operation is not affected by variations in the weight of the slices due to different areas of thicknesses of slices. The device for manually varying the toasting period is associated with the starting handle and both the manual and thermostatic controls operate through the same connection to the clock mechanism, thus simplifying the toaster structure. While the toast slices are elevated above the top of the toasting housing, the elevation is not jerky or sudden and is not accompanied by a jarring sound, both of which results may be objectionable.

The details of the structure may be varied substantially without departing from the spirit of the invention and the exclusive use of those modifications coming within the scope of the claims is contemplated.

What is claimed is:

1. In a bread toaster including a frame and upright members forming a toasting chamber and a bracket spaced from said chamber, a slice carrier extending through and a substantial distance beyond a member forming one end of said chamber and there pivoted to said bracket to swing vertically, spring means thrusting the carrier in one direction about its pivot to a slice projecting position, a lever fulcrumed on said bracket with a manually engageable handle on one end, said lever having an element engaging said carrier to shift the latter on its pivot to a toasting position against the thrust of said spring means, a latch engaging the carrier as said handle moves the carrier to toasting position, a timing mechanism including a part connecting the lever and latch for releasing said latch, and a device movable along said handle to shift said part relative to the latch to vary the timing of the release.

2. In a bread toaster, a frame, structure thereon forming a toasting chamber, a bracket on the frame outwardly of said chamber, a slice carrier in said chamber with a part extending through and a substantial distance beyond one end of said chamber and there pivoted to said bracket to swing in a vertical plane, spring means thrusting said carrier upwardly about its pivot to a slice projecting position, a manually operable lever fulcrumed on said bracket and including an arm engaging said carrier and having a handle beyond the end of said carrier and movable in one direction by said handle to lower the carrier against the thrust of said spring means to a slice retracting position, a latch pivoted on the frame for holding the lowered carrier against the thrust of the spring means, a finger pivoted on said lever and terminating adjacent the outer face of said handle, a timing mechanism for moving said lever in the opposite direction at the end of a predetermined period, and a lost motion linkage between said element and said latch, for tripping the latter as said lever raises said element, the shifting of said element on said lever varying the effective length of said linkage.

3. In a bread toaster, a frame, structure thereon forming a toasting chamber, a bracket on the frame with an arm extending away from said chamber, a slice carrier in said chamber with a part extending through and a substantial distance beyond one end of said chamber and there pivoted to said arm to swing in a vertical plane, spring means thrusting said carrier upwardly about its pivot to a slice projecting position, a manually operable lever fulcrumed on said bracket close to said chamber and extending outwardly beyond the end of said carrier and terminating in a handle hollowed to movably receive the ends of said arm and carrier, and a finger pivoted on said lever adjacent the chamber and extending alongside of said lever, through and projected from the outer face of said handle, a latch holding said carrier in lowered position, a timing mechanism raising said handle at the end of a predetermined period, and a linkage between said finger and said latch, the effective length of the linkage being controlled by the pivotal movement of said finger on said lever.

4. In a bread toaster including a frame, heating elements, slice carrier and a timing mechanism, a latch pivoted on the frame to engage the slice carrier as it is moved to toasting position and having a projection extending transversely of the plane of the latch movement, a link freely pivotally connected to the timing mechanism to move parallel to said plane and having an opening receiving said projection with an end opposing but normally spaced from and inclined to the path of movement of said projection about the latch pivot, as the link swings thereon, and a thermostat device positioned to move said link on its pivot as the device is heated by the toaster heating elements.

5. A toaster as described in claim 4 which includes manually operable means for shifting the pivotal connection between the link and the timing mechanism to vary the distances between the latch projection and the opposing end of the link opening.

6. A toaster as described in claim 4 which includes a manually operable lever for energizing the timing mechanism and shifting the slice carrier, a handle on said lever, there being a part pivoted on said lever and forming a portion of the pivotal connection between the timing mechanism and the latch, said part extending adjacent to said handle and being movable therewith as the handle is moved and movable thereon to vary said pivotal connection.

7. In a bread toaster including a frame, a housing enclosing a toasting compartment, a slice carrier therein, a manually operable lever fulcrumed on the frame and projecting outwardly from the housing and terminating in a handle movable manually to one position for lowering the carrier, a latch element pivoted on the frame and engaging the carrier when the latter is in lowered position, a spring-actuated timing mechanism, a connection between said lever and timing mechanism for energizing the latter; a link element having an adjustable connection to said lever and latch and tripping said latch on its pivot when the lever is raised to a predetermined position by said timing mechanism, one of said elements having a slot elongated in the direction of movement of said lever and the other of said elements having a part received in said slot and engageable by an end of said slot, said adjustable connection comprising a member movably mounted on said lever with a terminal near the lever handle and exteriorly of said housing, and shiftable relative to the lever handle to vary the distance between said element part and said slot end.

8. In a bread toaster including a frame, a housing enclosing a toasting compartment, a slice carrier therein, a lever fulcrumed on the frame and projecting outwardly from said housing and including a handle at its outer end and movable manually by said handle to one position for lowering the carrier, a latch pivoted on the frame and engaging the carrier when the carrier is in lowered position, a spring-actuated clock timing mechanism for returning the lever to its initial position, relatively movable parts forming a lost motion connection between said latch and lever, and an element movably mounted on said lever and securing one of said parts to the latter and having a manually operable terminal extending through a slot in said handle by which the element may be shifted to different positions on the handle and similarly shift the latter-mentioned part relative to the handle and lever and thereby vary the effective length of said connection.

9. In a bread toaster including a frame, a toasting compartment and a slice carrier, a member movable manually to lower the carrier, a latch pivoted on the frame for holding the carrier in lowered position, a clockwork timing mechanism slowly raising said member from carrier lowering position, a link connected to said mechanism to be moved upwardly and downwardly thereby and having a slot receiving a horizontally projecting portion of the latch and elongated in the direction of the link movement, one end of the slot engaging said latch portion after a predetermined movement of the link, for releasing the latch, and a manually movable connection between said link and timing mechanism for varying the relation between said slot end and said latch portion to determine the timing period for releasing the latch.

10. A toaster as described in claim 9 which includes a thermostat actuated by the temperature of the toasting compartment and an element movable by said thermostat to shift said link relative to said latch and vary the distance between the link slot end and the latch portion engageable thereby.

References Cited in the file of this patent

UNITED STATES PATENTS

| Number | Name | Date |
|---|---|---|
| 1,870,562 | Forbes | Aug. 9, 1932 |
| 1,923,590 | Schlemm | Aug. 22, 1933 |
| 2,052,927 | Hallwood | Sept. 1, 1936 |
| 2,147,386 | Sardeson | Feb. 14, 1939 |
| 2,152,100 | Scharf | Mar. 28, 1939 |
| 2,236,394 | Biebel | Mar. 25, 1941 |
| 2,236,395 | Biebel | Mar. 25, 1941 |
| 2,253,637 | McCullough | Aug. 26, 1941 |
| 2,301,070 | Myers | Nov. 3, 1942 |
| 2,343,347 | Turner | Mar. 7, 1944 |
| 2,371,084 | Warner | Mar. 6, 1945 |
| 2,387,817 | Wales | Oct. 30, 1945 |
| 2,388,641 | Myers | Nov. 6, 1945 |
| 2,389,434 | Huck | Nov. 20, 1945 |
| 2,491,829 | Palmer et al. | Dec. 20, 1949 |
| 2,508,464 | McCullough | May 23, 1950 |
| 2,538,650 | Palmer | Jan. 16, 1951 |
| 2,611,849 | Gough | Sept. 23, 1952 |